May 5, 1931.  L. L. PATTERSON  1,803,866
VEHICLE
Filed May 2, 1928   2 Sheets-Sheet 1
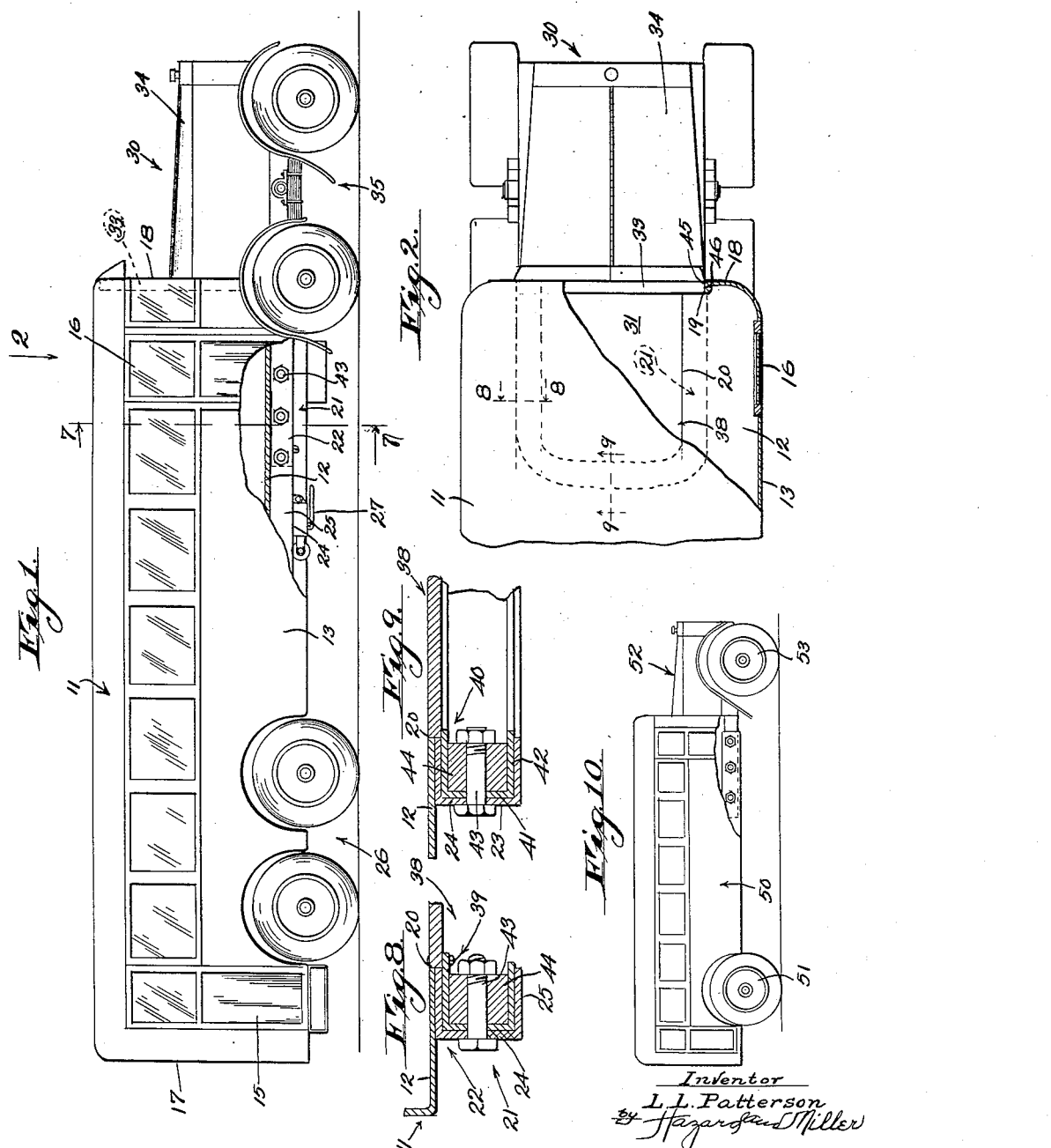

May 5, 1931.  L. L. PATTERSON  1,803,866
VEHICLE
Filed May 2, 1928  2 Sheets-Sheet 2
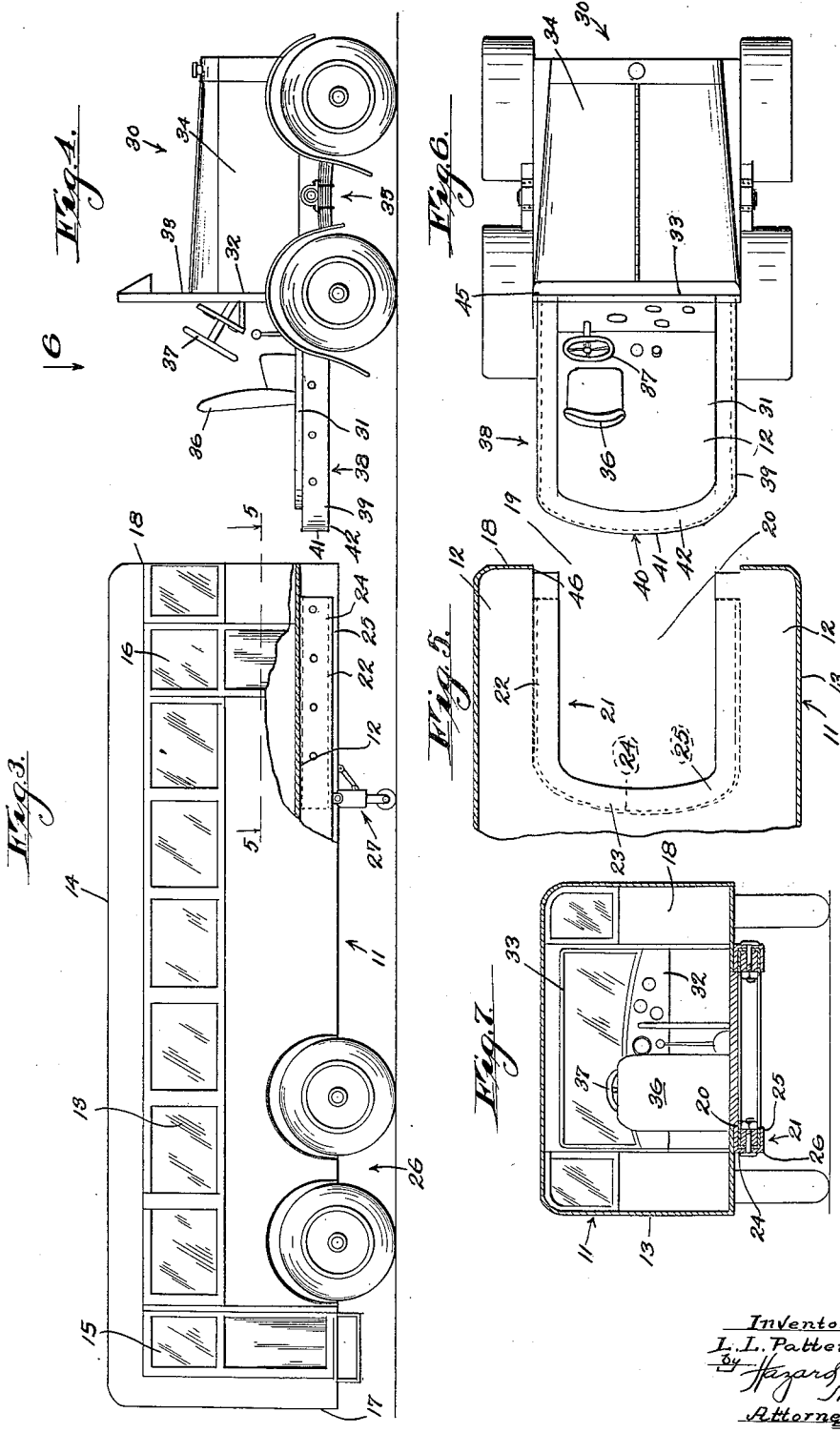
Inventor
L. L. Patterson
By Hazard and Miller
Attorneys Patented May 5, 1931

1,803,866

UNITED STATES PATENT OFFICE

LOUIS L. PATTERSON, OF LOS ANGELES, CALIFORNIA

VEHICLE

Application filed May 2, 1928. Serial No. 274,471.

My invention pertains to a vehicle particularly of a type which may be used as a motor stage for long distance traveling or for motor busses for more or less local transit. Motor stage lines now operate on such long routes that it is almost impracticable to run a single stage from one end of the route to the other. Moreover, there are a great many stage lines now operating on interstate charters and in which their hauling is limited mostly to interstate travel, and this is usually long distance travel. Some of such lines cover upwards of a thousand miles between terminals and frequently book passengers through the whole distance, the time of travel taking from forty to forty-eight hours or more.

The stage lines have found that the passengers object to being transferred from one vehicle to another; in other words, changing stages on such routes as this necessitates changing hand baggage, etc., therefore, it has been necessary to run a complete stage between the terminals, this requiring carrying two drivers, one driving while the other is resting or sleeping. This procedure is inefficient and more or less dangerous as the drivers become weary, not receiving proper rest; and moreover if anything is not operating properly in regard to the engine or driving mechanism the car is forced through to its destination without making repairs in time, thus necessitating costly repairs and a lengthy layup for the vehicle. Another procedure is to change drivers about every two hundred and fifty to three hundred miles, but this is unsatisfactory as a driver should be familiar with the engine and motive power that he is using, and use the same engine in his daily duties. Moreover, the carelessness or negligence of a first driver may cause trouble for the driver of the next division, the drivers having a tendency if any minor troubles develop to pass the car on, stating it is in good condition, only to have trouble develop with a subsequent driver. This necessitates high cost of repairs, etc.

An object of my invention is the construction of a motor stage particularly adapted for long distance travel in which the passenger carrying part of the vehicle and the part carrying the motive power and driving mechanism are in separate units which may be connected together or readily disconnected.

A more detailed object of my invention is the construction of the passenger carrying part of a vehicle and the motive power carrying part in the form of structures which may be telescoped together and bolted or clamped in a suitable manner to form a strong vehicle capable of travel at high speeds.

A more detailed object of my invention is the construction of a vehicle with the passenger carrying section having rear wheels supporting the floor and the body structure, this body structure having sides and a roof extending completely forward sufficient to enclose the driver's compartment, the floor, however having a cutout section adjacent the front with an arrangement for engaging the engine part of the vehicle. The engine part of the vehicle is formed as a separate truck having the engine and power plant with driving and steering wheels and a platform extending rearwardly from the dash and wind-shield, this platform having a seat for the driver and having all the mechanism for handling the vehicle mounted thereon. The platform has no roof over it and is designed to telescope or fit in the cutout section of the floor of the passenger part of the vehicle, and when these parts are fitted together may be bolted or otherwise secured so as to form a substantial and rigid structure. Therefore, by my construction, a motor stage may be built in which the power and driving unit may be disconnected from the passenger carrying part of the vehicle after runs say of two hundred and fifty to three hundred miles driven by a single driver, and another driving unit will be connected to the main portion of the stage. In the transfer the forward part of the passenger section may be supported on a jack or the like, and the passengers need not be disturbed.

This construction allows the motor stages to operate using the engine and power plant on a run which may be operated economically, and the engine and power plant may be overhauled before it is run an excessive distance. Moreover, this gives an opportunity for the drivers to have proper rest at division points, and each driver retains for use the same engine unit.

My invention is illustrated in the accompanying drawings, in which:

Fig. 1 is a side elevation of a motor stage partly broken away, illustrating my invention, Fig. 2 is a partial plan view taken in the direction of the arrow 2 of Fig. 1 partly broke away, Fig. 3 is a side elevation of the passenger part of a vehicle partly broken away and supported on a jack, Fig. 4 is a side elevation of the power plant carrying truck disconnected from the passenger part of a vehicle, Fig. 5 is a horizontal section of the passenger part of a vehicle, showing the floor structure, taken substantially on the line 5—5 of Fig. 3 in the direction of the arrows, Fig. 6 is a plan of the power plant truck taken in the direction of the arrow 6 of Fig. 4, Fig. 7 is a vertical transverse section taken substantially on the line 7—7 of Fig. 1 in the direction of the arrows, Fig. 8 is a detailed section on the line 8—8 of Fig. 2 through the side telescoping members.

Fig. 9 is a section on the line 9—9 of Fig. 2 through the end abutting members.

Fig. 10 is a side elevation of a modification of my invention showing a four-wheel type of vehicle suitable principally for city and suburban busses.

In constructing my invention I utilize what may be termed the passenger carrying portion of the vehicle 11. This is provided with a floor 12, side walls 13, a roof 14, and is illustrated as having doors 15 and 16. The vehicle has the usual back wall 17, and at the front there are inwardly extending walls 18 with a large open space 19.

The floor has a large open section 20 in the front and is illustrated as having a channel structure 21 built therein. This channel structure has side elements 22 and an end or base 23. The channel is illustrated as having a vertical webb 24 with horizontal flanges 25. (Note Figs. 8 and 9.)

For long distance travel I prefer to have the rear supporting wheels 26 in the form of a double truck, that is, having four wheels, and these are mounted on dead axles and are not driving wheels. At the forward end of the passenger part of the vehicle there is preferably a folding type of jack 27 which may be housed in an upward position as shown in Fig. 1 for travel, or extended downwardly as shown in Fig. 3 to support the forward part of the passenger section.

A truck 30 is illustrated as having a platform 31 extending rearwardly from the dash and wind-shield structure 32 and 33, and forward of the dash there is the usual engine hood containing the power unit 34.

The wheels 35 are preferably driving and steering wheels. The particular arrangement for driving and steering is not illustrated herein as it does not form an immediate part of this application.

A driver's seat 36 is mounted on the platform 31, and conveniently positioned there is a steering wheel 37 and other appliances necessary to handle the vehicle. Below the platform there is an inner telescopic structure 38 which is illustrated as having side channels 39 and an abutment channel 40, these being formed in one piece and having a vertical webb 41 and horizontal flanges 42. The platform fits in the open space 20 of the floor 12 of passenger section so that the channels interfit or telescope. They are then secured by bolts 43 extending through blocks 44 and through the webbs of the channels, thus holding the passenger section and the truck section securely together.

In the structure illustrated the side edges 45 of the wind-shield and dash construction are adapted to fit between the inner edges 46 of the front walls of the passenger section of the vehicle, and may have a suitable packing to make a substantially wind-proof connection. Therefore, by this construction when the two parts of the vehicle are secured together it forms a stage with the drive through the wheels of the truck, either one or both pair of these wheels being steering wheels, and the wheels of the passenger section being merely trailing wheels having no driving function. As the large stages use either air or hydraulic brakes, the braking system on the rear wheels may be connected to the brake mechanism on the truck in any suitable disconnectible manner.

In Fig. 10 the passenger portion of the vehicle designated by the numeral 50 is provided with a single set of rear wheels 51 and the truck portion 52 with a single set of driving and steering wheels 53.

It is to be understood that the floor of the passenger vehicle is cut away as illustrated for the latter stage as well as for the stage illustrated in Figs. 1 through 7, and the truck portion has a platform interfitting and telescoping with the floor structure of the passenger part in the manner set forth above. When the two parts are separated the truck is supported by a dolly type of transfer allowing shifting in different positions and the passenger portion of the vehicle may be supported on a jack. It will therefore be seen that the construction of Fig. 10 is manifestly suitable for city and suburban bus lines providing for disconnecting the power plant unit from the passenger carrying unit to allow repairs, etc; and thus by having a larger number of the power plant units than the passenger carrying units the latter may be maintained in operation.

An important feature of my invention is that the truck unit is provided with the power plant and with the steering and driving wheels and also has accommodation for the driver of the vehicle with the controls directly accessible to such driver. Such controls comprise the usual spark and throttle control, the steering wheel, the brakes, clutch and gear shift lever, these being the usual devices for control of an automobile or the like.

Therefore, in the construction illustrated in Figs. 1 through 6, the truck when separated from the load carrying portion of the vehicle may be operated by the driver and driven for repairs or the like or driven to connect on to another load carrying unit. Also in the form shown in Fig. 10 when the truck unit is disconnected from the load carrying unit and a dolly is placed under the platform portion, this part likewise can be driven by its power plant; the wheels steered by the steering mechanism, the driver being on the platform.

Moreover, by this construction it is not necessary when connecting the front wheels to the load carrying unit to make connections of the steering mechanism or other control devices as these are all already incorporated in the truck unit and attached and detached with said unit to and from the load carrying unit.

Various changes may be made in the principles of my invention without departing from the spirit thereof, as set forth in the description, drawings and claims.

I claim:

1. A motor vehicle having a truck unit with a power plant and steering wheels with means to control same from a platform extending rearwardly with inner structure beams adjacent the side edges of the platform, a load carrying unit having a floor with an opening at the front forward end, a pair of outer structural beams on each side of said opening, the inner beams of the platform being adapted to telescopically interfit with the outer beams adjacent the floor, and means to rigidly secure said beams together, the load carrying unit having wheels adjacent the rear end.

2. A motor vehicle having a truck unit with a power plant and steering wheels with means to control the same from a platform extending rearwardly with a driver's seat on the platform, a load carrying unit having a floor with wheels adjacent the rear portion and an opening in the floor adjacent the front, the said platform being adapted to fit in the said opening in a telescopic manner, and means to rigidly secure the truck unit and the load carrying unit rigidly together at the platform and adjacent the floor at the said opening.

3. A motor vehicle having a truck unit with a power plant, steering wheels, means to control the same from a platform extending rearwardly with channel beams on the outside edges, a load carrying unit having a floor with wheels adjacent the rear end, the floor having an opening at the front with channel beams on each side of said opening, the channel beams of the platform being adapted to telescopically interfit with the channel beams at the opening, and means to rigidly secure the channel beams together to form a rigid connection between the truck unit and the load carrying unit.

4. A motor vehicle having a truck unit as claimed in claim 3, the rear end of the platform being provided with a channel beam and the rear portion of the opening having a channel beam, said channel beams interfitting, and means to secure said beams rigidly together.

5. A motor vehicle having a truck unit with a power plant, steering wheels, means to control the same, a dash and wind-shield structure, a load carrying unit having a floor, supporting wheels adjacent the rear end, side walls, a roof structure, there being front walls with a central opening, the truck unit interfitting with the load carrying unit whereby the dash and wind-shield structure fits between the openings in the front wall, and means to rigidly secure said units together.

6. A motor vehicle having a truck unit with a power plant, steering wheels, means to control the same from a rearwardly extending platform, a dash and wind-shield construction at the forward end of the platform, a load carrying unit having a floor, rear wheels adjacent the rear end, side walls, a roof, front wall structures with a central opening in the front wall, there being an opening in the floor at the front, the said platform fitting in said opening, and a dash and wind-shield construction fitting in the opening of the front wall, and means to rigidly secure the platform to the load carrying unit adjacent said opening in the floor.

7. A motor vehicle having a truck unit with a power plant, steering wheels, means to control the same from a rearwardly extending platform having side beams and a dash and wind-shield construction, a load carrying unit having a floor with an opening in the front with beams on each side of said opening supporting the wheels adjacent the rear end, side walls, a roof, front walls with an opening, the platform of the truck fitting in the opening of the floor, the said beams on the platform interfitting and telescoping in the beams at the opening with means to secure said beams rigidly together, the dash and wind-shield construction fitting in the opening in the front walls.

8. A motor vehicle having a truck unit as claimed in claim 7, the platform having a driver's seat and the said roof extending over the opening in the floor and forming a covering for the platform when the units are connected.

9. In a motor vehicle a load carrying unit having a floor, side walls, a roof, supporting wheels adjacent the rear end, the floor having an opening at the front with structural elements built into each side of said opening to receive an inner rearwardly projecting structure of a truck, the roof extending over said opening, front walls extending partly inwardly and leaving a space between the inwardly extending portions of said front walls, said space being adapted to receive the dash and wind-shield of a truck.

10. A motor vehicle having a truck unit with a power plant, driving wheels operatively connected to said plant, steering wheels, a platform on the truck unit having a driver's seat and control devices for the power plant, the steering wheels and the connection to the driving wheels, positioned to be directly controlled by the driver from the driver's seat, a load carrying unit having a floor with wheels adjacent the rearward end, the said floor having an opening to accommodate the platform, the said truck unit and load carrying unit being detachable and means to rigidly connect the platform of the truck and the forward end of the load carrying unit.

In testimony whereof I have signed my name to this specification.

LOUIS L. PATTERSON.